United States Patent
Vaidyanathan et al.

(10) Patent No.: US 6,266,665 B1
(45) Date of Patent: Jul. 24, 2001

(54) INDEXING AND SEARCHING ACROSS MULTIPLE SORTED ARRAYS

(75) Inventors: Shankar Vaidyanathan, Bellevue; Philip Lucido, Redmond; Sundeep Bhatia, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/192,057

(22) Filed: Nov. 13, 1998

(51) Int. Cl.⁷ ..................................................... G06F 17/30
(52) U.S. Cl. .................. 707/7; 707/101; 704/7; 370/392
(58) Field of Search ............................ 707/101, 7; 704/7; 370/392

(56) References Cited

U.S. PATENT DOCUMENTS

| | | | |
|---|---|---|---|
| 5,121,493 | * | 6/1992 | Ferguson .................................. 707/7 |
| 5,724,593 | * | 3/1998 | Hargrave, III et al. ................. 704/7 |
| 6,018,524 | * | 1/2000 | Turner et al. ......................... 370/392 |
| 6,119,120 | * | 9/2000 | Miller .................................... 707/101 |

OTHER PUBLICATIONS

Bhatia et al., "Conceptual Clustering In Information Retrieval," Systems, Man, and Cybernetics, Part B, IEEE Transactions, v. 28, issue 3, pp. 427–436.*

Bhatia et al., "Testing of Iterative Logic Arrays," Circuits and Systms, 1990, Procedings of the 33 Midwest Symposium, Aug. 12, 1990, v. 1, p. 243–246.*

* cited by examiner

Primary Examiner—Thomas Black
Assistant Examiner—Charles L. Rones
(74) Attorney, Agent, or Firm—Woodcock Washburn Kurtz Mackiewicz & Norris LLP

(57) ABSTRACT

Indexing and searching across multiple sorted arrays. In one embodiment, a method. First, for a plurality of arrays, each array having a plurality of elements indexable by a pointer for the array, finding a smallest element of a set of elements comprising the element of each array at the pointer for the array. Second, increasing the pointer for the array in which the smallest element was found. Third, repeating until a desired number of smallest elements is found.

30 Claims, 5 Drawing Sheets

INDEXING AND SEARCHING ACROSS MULTIPLE SORTED ARRAYS

RELATED APPLICATIONS

Coassigned, copending, and cofiled application Ser. No. 09/191,499, filed Nov. 13, 1998, entitled "Dynamic Parsing" currently pending; Ser. No. 09/191,781, filed Nov. 13, 1998, entitled "Automatic Statement Completion" currently pending; and Ser. No. 09/191,757, filed Nov. 13, 1998, entitled "Automated Help Information" currently pending.

FIELD

This invention relates generally to indexing and searching, and more particularly to such indexing and searching across multiple sorted arrays.

BACKGROUND

In some contexts, programmers desire to index and search across multiple arrays, such as may be stored in different arrays and that may be previously sorted themselves. For example, in the context of providing for autocompletion of statements as described more fully in the applications incorporated by reference, a program may have to display a list box of a given number of sorted elements from all the elements of the different arrays, beginning at a desired position within a global array encompassing all the different arrays.

Within the prior art, the solution to this problem is usually to first create a global array encompassing all the different arrays, and then sorting this array. However, this is a time-consuming process. For example, where each of the different arrays making up the global array consist of hundreds or thousands of elements, the amount of time to construct the sorted global array is great. In the context of providing a list box of a subset of sorted elements of the global array (for example, ten or fifteen such elements) so that the user is able to choose one of the elements, the delay in first creating the global array is significant, such that it is noticed by the user. This makes the use of the list box in picking one of the elements less convenient for the user.

Furthermore, a virtual global array can actually be created, such that indexing thereon is much more easily performed, when the individual arrays do not themselves dynamically change. However, in certain situations, the contents of these arrays are constantly changing. One array, for example, may have a list of members of a current class, while another array may have a list of members of a current function—where the current class and function change, therefore, the contents of the arrays change, too. Other situations in which changing arrays exist include computer games and telephone directories, etc.

There is a need, therefore, for faster searching and indexing across multiple lists.

SUMMARY

The above-identified problems, shortcomings and disadvantages with the prior art, as well as other problems, shortcoming and disadvantages, are solved by the present invention, which will be understood by reading and studying the specification and the drawings. In one embodiment, a method first finds a smallest element of a set of elements, comprising the element of each array of a plurality of arrays, at a pointer for the array. Each array thus has a plurality of elements indexable by the pointer for the array. Next, the method increases the pointer for the array in which the smallest element was found. Finally, the method repeats until a desired number of smallest elements is found.

The invention provides for advantages not found in the prior art. Specifically, for example, the invention provides for a desired sub-array of a virtual global array construed as a sorted union of the elements of the plurality of arrays, by constructing the sub-array without actually constructing the virtual global array first. This provides for faster indexing and searching as compared to the prior art.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, methods, in accordance with different embodiments of the invention, are provided. Finally, in the fourth section, a conclusion of the detailed description is provided.

Hardware and Operating Environment

Figure 1:
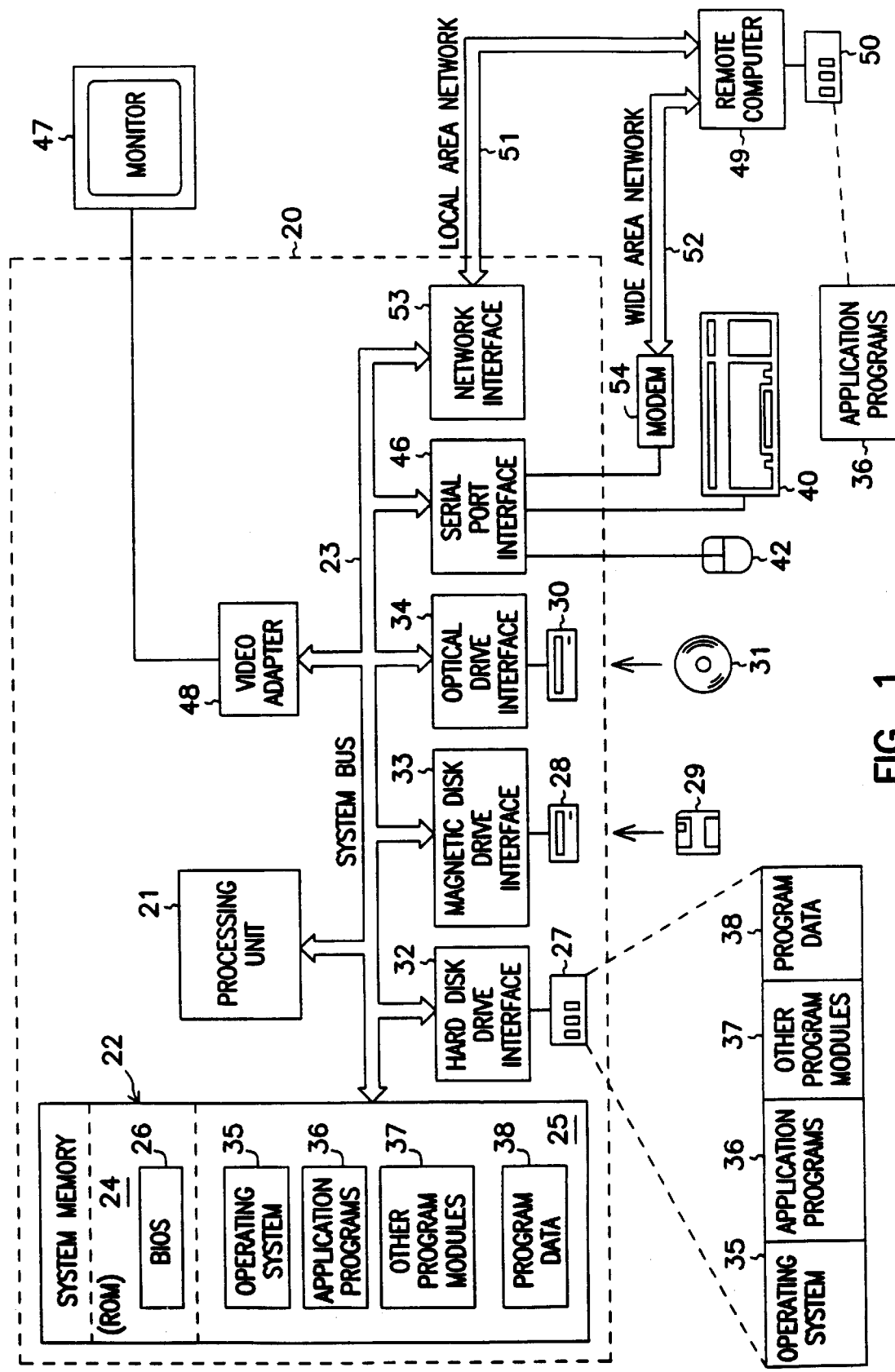
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computerexecutable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
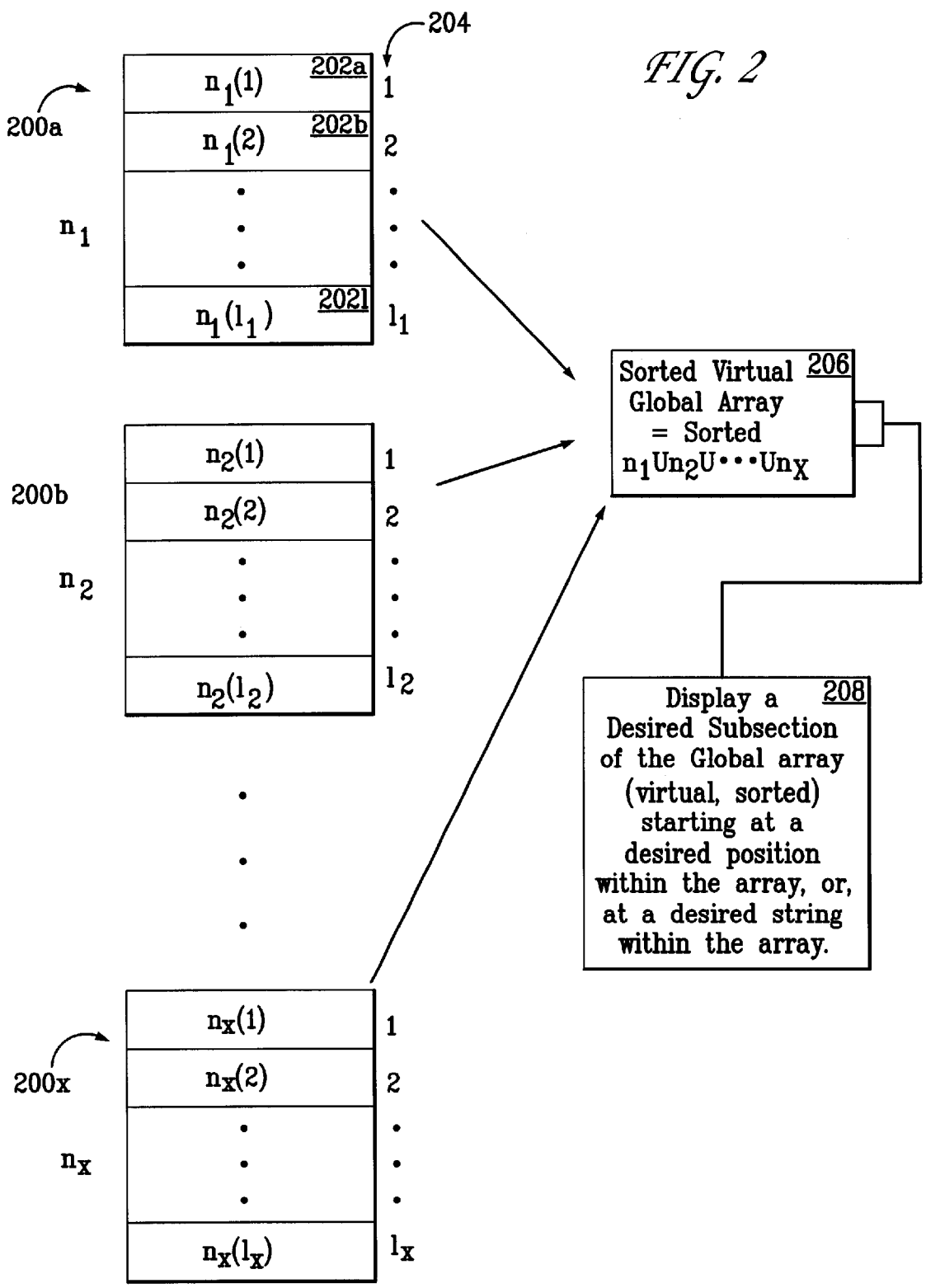
FIG. 2 shows a block diagram of a system according to one embodiment of the invention.

In this section of the detailed description, a description of a computerized system according to an embodiment of the invention is provided. The description is provided by reference to FIG. 2. Referring now to FIG. 2, a system according to an embodiment of the invention is shown. The system includes a plurality of arrays 200a, 200b, . . . , 200x. Each array is also identifiable by n_y, where y spans from 1 . . . x. Each array has a plurality of elements; for example, array 200a has elements 202a, 202b, . . . , 202l. Each array element of each array is also identifiable by n_y(z), where z spans from $1 \ldots l\_n$, and $l\_n$ is the number of elements in array n. Furthermore, each of the plurality of elements within a given array is indexable by a separate pointer for that array; for example, array 200a has a pointer that can be set to any value $1, 2, \ldots l\_1$, as represented by 204 in FIG. 2. In one embodiment, each of the arrays is sorted, for example, alphabetically, reverse-alphabetically, numerically, and reverse-numerically. The invention is not so limited.

As an example for illustrative purposes only, there can be three arrays, n__1, n__2 and n__3. Array n__1, for example, may have five elements, n__1(1), n__1(2), . . . , n__1(5). The pointer for array n__1 thus may be any value from 1 . . 5. Array n__2, for example, may have four elements, n__2(1), n__2(2), . . . , n__2(4). The pointer for array n__2 thus may be any value from 1 . . 4. Finally, array n__3, for example, may have nine elements, n__3(1), n__3(2), . . . , n__3(9), such that the pointer for array n__3 may be any value from 1 . . 9.

The invention is not limited to what each element within each array is, or represents. In one embodiment, each element is a string; for example, "dog," "cat," "bird," etc. In another embodiment, each element is a string, and represents an autocompletion statement, as is described in more detail in the applications that have been incorporated by reference.

The sorted union of all the arrays 200a, 200b, . . . , 200x, as the term union is known within the art, can be construed as a sorted virtual global array 206. For example, if there were two arrays, where n__1(1)="cat," n__1(2)="dog," n__2(1)="bird," n__2(2)="elephant," the sorted virtual global array g would have elements g(1)="bird," g(2)="cat," g(3)="dog," and g(4)="elephant." The virtual global array 206 is virtual in that it is not actually constructed within the system—rather it is a representation meant for easier understanding of the invention, as those of ordinary skill within the art can appreciate. That is, the virtual global array 206 is referenced as shown in FIG. 2 as a shorthand mechanism for stating "the union of all the elements of all the plurality of arrays." As to making and using the invention, the global array is not in actuality ever constructed, for example, in the memory of a computer such as that as has been described in the previous section of the detailed description Thus, as shown as 208 in FIG. 2, a desired sub-array of the virtual global array may be constructed. The desired sub-array is constructed directly from the plurality of arrays 200a, 200b, . . . , 200x, without using an actual version of the virtual global array 206. That is, the desired sub-array is created without first creating a global sorted array of the union of the elements of each of the plurality of arrays.

In one embodiment, the desired sub-array is a list of elements, the list being of a predetermined length, of the global array, starting at a predetermined position within the virtual global array—such as a desired position, or starting at a desired string within the virtual global array. For example, using the previous example where there are two arrays, where n__1(1)="cat," n__1(2)="dog," n__2(1)="bird," n__2(2)="elephant," a desired sub-array (or, sub-section) may be two elements in length, starting with the first element beginning with the letter "c." In this case, the desired sub-array s is s(1)="cat," and s(2)="dog." Note that in accordance with the invention, this sub-array is created without first creating a sorted global array. One embodiment to accomplish this is described in conjunction with FIGS. 3(a)–3(c), in the next section of the detailed description.

Another desired sub-array using this example may be three elements in length, starting with the element at the 25% position of the virtual global array. Since there are four total elements in the virtual global array, this means that the sub-array starts with the element at position 2 in the virtual global array. Thus, the desired sub-array s in this instance is s(1)="cat," s(2)="dog," s(3)="elephant."

The invention is not limited to a particular application. In one embodiment, the invention is utilized to create a list box (viz., the desired sub-array) of a relatively small number of autocompletion statements (each statement being an element of some array) for use in the context of program development, as is more fully described in the applications incorporated by reference. In such an application, each of the different arrays from which the sub-array is populated may have hundreds or thousands of elements. In the prior art, creating a list box may entail first constructing a sorted global array of the union of all the elements of all the arrays. However, this is very expensive from the time and space (memory) perspective, such that the resulting list box is not convenient to use from a programmer's standpoint. Because the invention does not involve creating a sorted global array before creating the sub-array, the process is much faster, making the resulting list box more useable for the programmer.

In one particular embodiment of the invention, a computer, such as that which has been described in the previous section of the detailed description, includes a processor and a computer-readable medium (for example, a memory) coupled thereto. In such a computer, data is stored in the medium that represents the plurality of arrays, where each array has a plurality of elements indexable by a pointer for that array, as has been described. Furthermore, data is stored in the medium that represents the desired sub-array of a virtual global array, which is construed as a sorted union of the elements of the plurality of arrays, where the sub-array is directly constructed from the plurality of arrays without constructing the virtual global array.

Methods

Figure 3A:
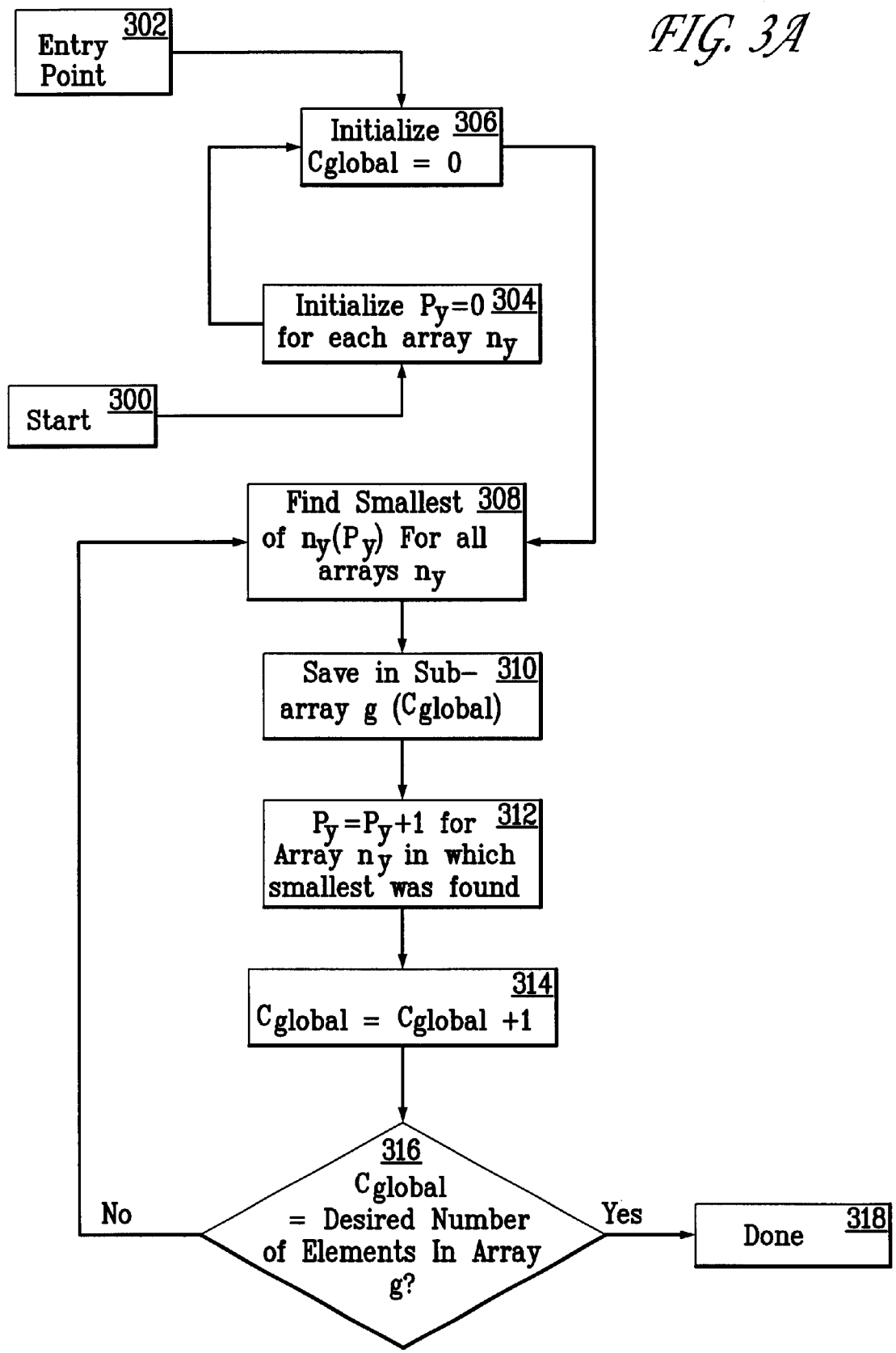
FIG. 3(a) shows a flowchart of a method according to an embodiment of the invention.
Figure 3B:
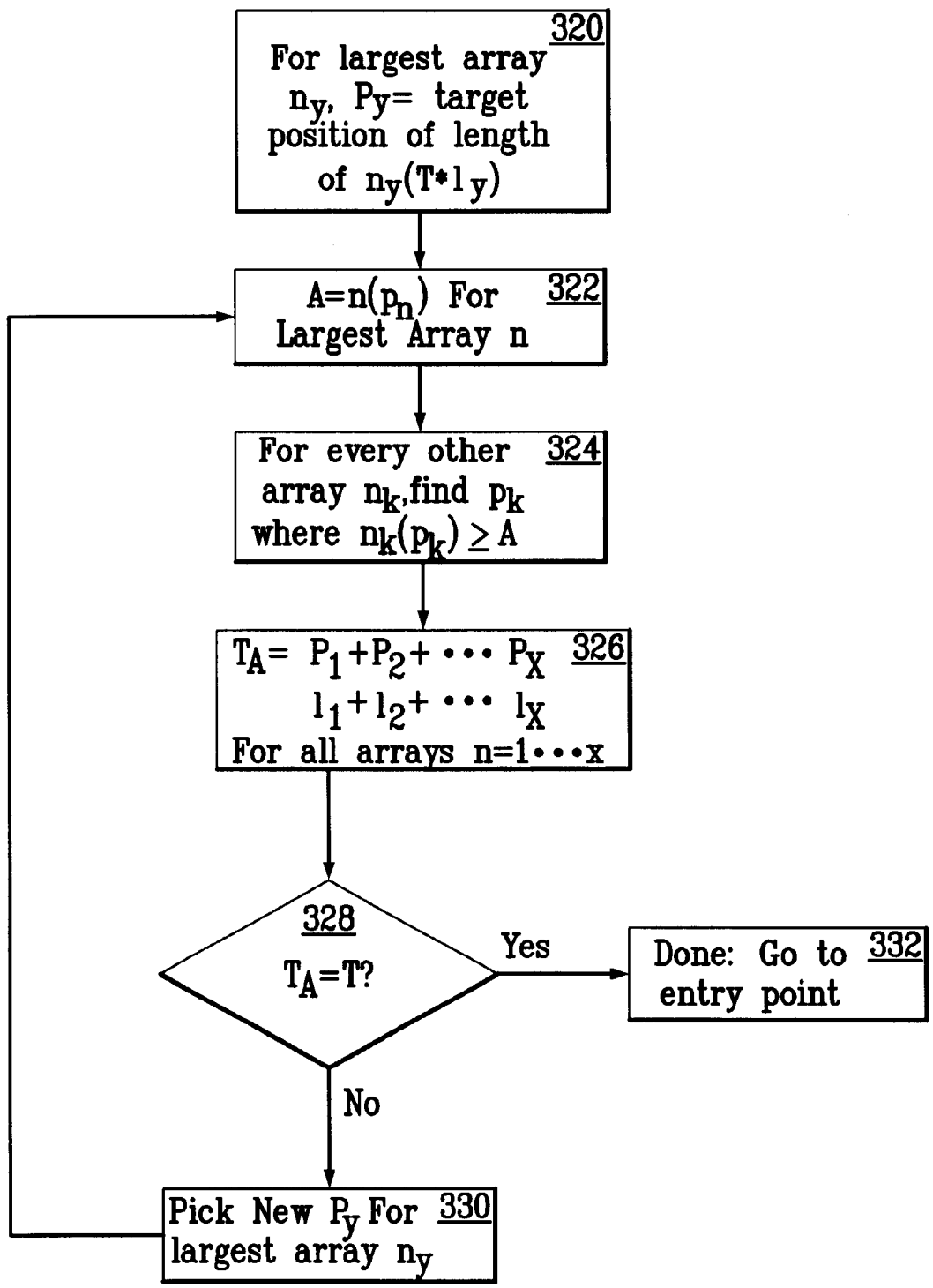
FIG. 3(b) shows a flowchart of another method according to an embodiment of the invention; and, FIG. 3(c) shows a flowchart of still another method according to an embodiment of the invention.
Figure 3C:
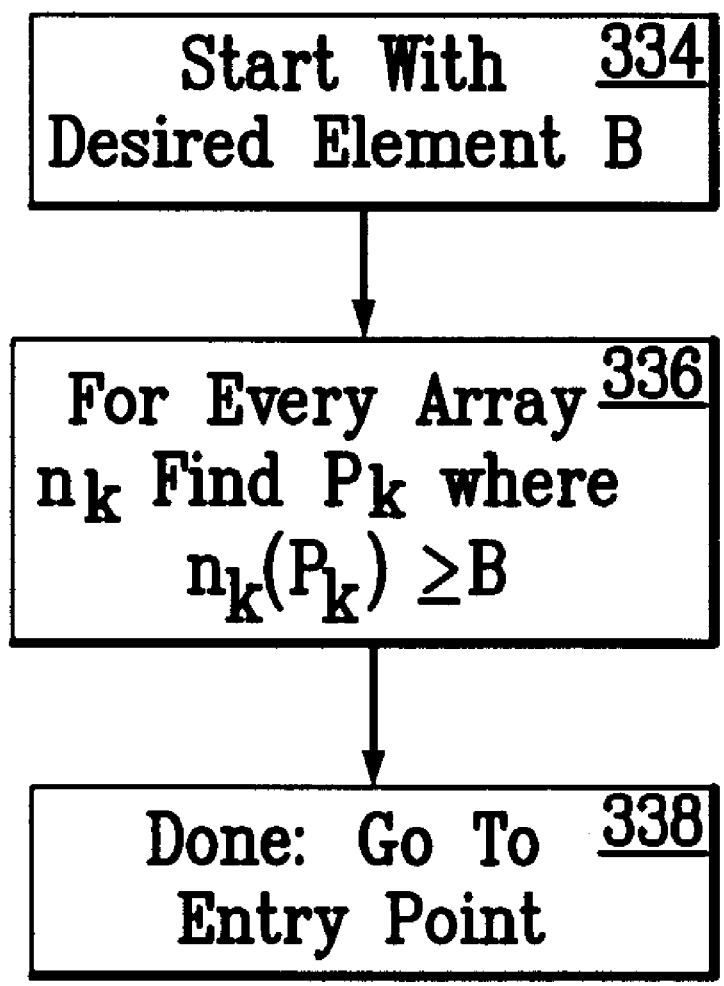

In this section of the detailed description, methods according to embodiments of the invention are presented. This description is provided in reference to FIGS. 3(a)–3(c). The methods FIGS. 3(a)–3(c) represent embodiments of the invention in conjunction with which a desired sub-array, as described in the previous section of the detailed description, may be constructed without constructing a virtual global array. One or more of the computerized methods are desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Referring first to FIG. 3(a), a flowchart of a method according to an embodiment of the invention is shown. When the method of FIG. 3(a) is used not in conjunction with the method of FIG. 3(b) or FIG. 3(c), the method starts at 300, whereas if it is used in conjunction with the method of FIG. 3(b) or FIG. 3(c), it starts at 302. In 304, the method initializes the pointer p__y for each array n__y to zero. It is noted that in the methods of FIGS. 3(a)–3(c), the first element of a given array n__y is referenced by n__y(p__y=0), which is slightly different than as has been described in the previous section of the detailed description, where the first element of a given array n__y was effectively referenced by n__y(p__y =1). In 306, a global pointer c__global is also initialized to zero.

In 308, the smallest of the elements n_y(p_y), of all arrays n_y, is found. It is noted that in one embodiment of the invention, it is assumed that each of the arrays n_y has been previously sorted. Thus, if there are two arrays n_1(0)=3, n_1(1)=5, n_2(0)=4, n_2(1)=9, then the smallest of the elements n_1(p_1=0)=3 and n_2(p_2=0)=4 would be determined, which is 3. In other words, in 308, for a plurality of arrays, where each array has a plurality of elements indexable by a pointer for that array, a smallest element of a set of elements including the element of each array at the pointer for that array is found. In 310, this element is saved in a desired sub-array g at pointer location c_global, or in s(c_global).

In 312, the pointer for the array in which the smallest element was found in 308 is increased to point to the next element in that array. In one embodiment, for example, the pointer is increased by one to point to the next element in that array. In 314, the pointer c_global is also increased to point to the next empty slot in the desired sub-array. In one embodiment, this pointer is also increased by one. In 316, it is determined whether the value of c_global equals the desired number of elements to be populated in the desired sub-array g. If not, then the process repeats at 308, until the desired number of smallest elements is found, at which point the method ends at 318.

Starting at 300, the method of FIG. 3(a) provides a manner by which a number of sorted lists (viz., arrays) may be effectively merged and sorted to produce a desired sub-list of a virtual list that is the union of all the sorted lists (viz., a sub-array of a virtual array that is the union of all the sorted arrays), starting with the smallest element of all the first elements of all the sorted lists combined (and, since these lists are themselves sorted in one embodiment, of all the elements total of all the sorted lists combined), without actually constructing the virtual array in totality, which is expensive with respect to the amount of memory (space) required as well as the computational time it takes to build such an array. The smallest element in the context of numerical elements refers to the least element, such that the smallest element is less than or equal to all the other elements. The (alphabetically) smallest element in the context of string or character elements refers also to the least element, such that the smallest element is less than or equal to all the other elements, as statements such as (string one="a")<(string two="ab") are typically evaluated in the art.

As an example of the operation of FIG. 3(a), consider the two arrays previously described, n_1(0)=3, n_1(1)=5, n_2(0)=4, n_2(1)=9, such that a sub-array having two elements, starting at the smallest element of all the elements in the arrays, is desired. After initialization of p_1=p_2=0 in 304, and of c_global=0 in 306, the smallest of the elements n_1(p_1=0)=3 and n_2(p_2=0)=4 is found, which is 3, in 308. This is stored in g(c_global=0)=3 in 310. In 312, p_1 is increased by one to 1, and in 314 c_global is also increased by one to 1. In 316, the value of c_global is not equal to the desired number of elements in g (two), so the process repeats. In 308 the second time around, the smallest of the elements n_1(p_1=1)=5 and n_2(p_2 still=0)=4 is found, which is 4. This is stored in g(c_global=1)=4 in 310. In 312, p_2 is increased by one to 1, and in 314 c_global is increased by one to 2. In 316 this time, however, the value of c_global is equal to the desired number of elements in g, so the process ends at 318.

Thus, the resulting sub-array g is g(0)=3 and g(1)=4, which is a sub-array of the virtual global array v(0)=3, v(1)=4, v(2)=5 and v(3)=9 construed as the union of the elements of the arrays n_1 and n_2. This sub-array was constructed by the method of FIG. 3(a) without constructing the virtual global array itself, however. The construction of such a sub-array in this manner is an advantage of the invention.

In the method of FIG. 3(a), the sub-array is created starting with the smallest element of all the elements of the plurality of arrays (assuming that these arrays are sorted), and extending for a desired numbered of elements. However, there are instances when it is desirable for the sub-array to be created such that the first element of the sub-array is not the smallest element of all the elements of the plurality of arrays, but rather a different element. Such an alternative starting position may be referenced by a percentage position, for example, of the virtual global array (e.g., starting 75% of the way down in the virtual global array), and may also be referenced by a specific element (e.g., where the elements are strings, start with the element beginning with "sk," or the closest element to "sk," such as "slip," etc.). These two situations are handled in turn by reference to FIG. 3(b) and FIG. 3(c).

Referring first to FIG. 3(b), a method according to another embodiment of the invention is shown. The method of FIG. 3(b) is for the situation when the alternative starting position is referenced by a desired global target position expressed as a percentage position of the virtual global array, such as starting 75% of the way down in the virtual global array. In 320, for the largest array n_y—which is the array having the greatest number of elements, or an array tied for having the greatest number of elements—the pointer for the array p_y is set to a target position within the array n_y. In one embodiment, this target position is defined as the length or size of the largest array (in number of elements) multiplied by the percentage of the desired global target position.

In 322, a temporary variable A is set to the element n_y(p_y) for this largest array n_y. In 324, for every other array n_k besides the largest array n_y, the pointer for every other array p_k is set such that n_k(p_k) matches the temporary variable A, according to a first criteria. In one embodiment, this first criteria is such that p_k is set so that n_k(p_k) is greater than or equal to A. In other words, in 324, the pointer for each array of the plurality of arrays, except for the largest array, is set to point to an element of that array that matches, according to the first criteria, the element of the largest array at the target position within the largest array.

In 326, a global target position is determined, which is the actual target position within the virtual global array. This is determined by dividing the sum of the value of the pointer for each array by the sum of the lengths or sizes of each array. In other words, the global target position T_a=(p_1+n_2+...+p_d)/(l_1+l_2+...l_d), where p_d is the pointer for the last array of the plurality of arrays, and l_w is the size or length of array n_w, such that l_d is the size or length of the last array of the plurality of arrays. The resulting global target position T_a is also expressed as a percentage.

In 328, it is determined whether this actual global target position T_a matches the desired global target position T, according to a second criteria. In one embodiment, the second criteria is such that T_a is equal or substantially equal to the desired global target position. If T_a does not match T, then in 330, a new pointer p_y is picked for the largest array n_y (that is, the target position within the largest array is set to a new value), and the process is repeated at 322 until the global target position matches the desired global target position according to the second criteria in 328.

The new p_y is picked by doing a binary search on n_y. Let us name the current p_y to be p_y1. Now if T_a>T, then this means that we over-shot the target, and we need to pick some value that is smaller than the current pick (p_y1). So we pick the mid value between 0 and p_y1. Let us call this new value to be p_y2. As before, steps 322, 324, and 326 in FIG. 3(*b*) are repeated. If the new T_a is still greater than T, then we pick the mid-value between 0 and p_y2, and make that p_y3. However if the new T_a<T, then we undershot the target. So we pick a mid value between p_y2 and p_y1 and make that p_y3. We continue this process until we reach the point where T_a is equal to T.

Once the global target position matches the desired global target position, this means that the pointer for each array has been set appropriately such that the desired global target position matches the actual global target position. In other words, the starting position for the pointer of each array has been set correctly, such that the method of FIG. 3(*a*) may be entered at 302 so that the desired number of elements in the sub-array of the virtual global array, starting at the desired global target position within the virtual global array, may be obtained. The difference between entering the method of FIG. 3(*a*) at 302 as opposed to entering the method of FIG. 3(*a*) at 300 as has been previously described is that in the former case the pointer for each array is not initialized to point to the first element of that array, since the method of FIG. 3(*b*) set the pointer for each array to point to an element such that the desired global target position within the virtual global array is correct.

Referring finally to FIG. 3(*c*), a method according to still another embodiment of the invention is shown. The method of FIG. 3(*c*) is for the situation when the alternative starting position is referenced by a specific desired element (such as a given string). In 334, the method starts with the desired element B. In 336, for every array n_k, the pointer for that array p_k is determined such that the element of the array n_k at the pointer p_k n_k(p_k) matches the desired element B, according to a criteria. In one embodiment, the criteria is such that the pointer p_k for each array n_k is determined such that the element n_k(p_k) is equal to or greater than the desired element B. Note that in the instance where all the elements, including the desired element B, are strings or characters (chars), this criteria is performed as known in the art.

In 338, the method of FIG. 3(*c*) is finished, such that the method of FIG. 3(*a*) may be entered at 302 so that the desired number of elements in the sub-array of the virtual global array, starting at the desired starting position as utilized by the method of FIG. 3(*c*) to determine the initial value of the pointer for each of the arrays, may be obtained. For example, consider a case where there are two arrays, n_1(0)="cat," n_1(1)="elephant," n_2(0)="bird," n_2(1)="dog," and where the desired sub-array is two elements in length, starting with an element beginning with the string "c." The method of FIG. 3(*c*) produces in 336 a pointer p_1 for array n_1 set to 0, since (n_1(0)="cat")>"c," and a pointer n_2 for array n_1 set to 1, since (n_2(1)="dog")>"c." Thus, the method of FIG. 3(*a*) starts with p_1=0, and p_2=1, such that the method of FIG. 3(*a*) produces a sub-array s_1="cat" and s_2="dog."

Those of ordinary skill within the art can appreciate that the methods of FIG. 3(*b*) and FIG. 3(*c*) that have been described are only two manners by which the pointer for each array may be initialized before performing the method of FIG. 3(*a*) beginning at the entry point (as opposed to the start point, which initializes the pointer for each array to point to the first element of that array). That is, each of the methods of FIGS. 3(*b*) and 3(*c*) is one embodiment by which the pointer for each array is initialized to a given position within that array. The invention is not limited to these embodiments, however, nor to the embodiment of FIG. 3(*a*) (beginning at the start point instead of the entry point) where the pointer for each array is initialized to point to the first element of that array.

Conclusion

Indexing and searching across multiple arrays has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
    for the largest of a plurality of arrays, each array having a plurality of elements indexable by a pointer for the array, setting the pointer for the largest array to a target position within the largest array;
    setting the pointer for each array of the plurality of arrays except for the largest array to an initial position;
    determining a global target position by dividing a sum of the pointer for each array by a sum of the lengths of each array;
    determining whether the determined global target position matches a desired global target position;
    upon failing to match the global target position to the desired global target position, setting the target position within the largest array to a new value, and repeating until the global target position matches the desired global target position.

2. The method according to claim 1, further comprising initially setting the target position within the largest array to a length of the largest array multiplied by the desired global target position.

3. The method according to claim 1, wherein the initial position for each array of the plurality of arrays except for the largest array is chosen so that the element of each array at the initial position is equal to or greater than a desired element.

4. The method according to claim 3, wherein the desired element is the element of the largest array at the target position.

5. The method according to claim 1, wherein the initial position for each array of the plurality of arrays except for the largest array is the first position in each array.

6. The method according to claim 1, wherein the elements in the arrays are strings.

7. The method according to claim 1, wherein the determined global target position matches the desired global target position when it is substantially equal to it.

8. The method according to claim 1, wherein setting the target position within the largest array to a new value is performed using a binary search.

9. The method according to claim 1, further comprising:
    finding the next n smallest elements in the union of the plurality of arrays, where n is any desired number.

10. The method according to claim 1, further comprising:
    constructing an array from the next n smallest elements in the union of the plurality of arrays, where n is the desired number of elements in the array.

11. A computer-readable medium having a computer program stored thereon for execution on a computer, the program adapted to perform a method comprising:

for the largest of a plurality of arrays, each array having a plurality of elements indexable by a pointer for the array, setting the pointer for the largest array to a target position within the largest array;

setting the pointer for each array of the plurality of arrays except for the largest array to an initial position;

determining a global target position by dividing a sum of the pointer for each array by a sum of a length of each array;

determining whether the determined global target position matches a desired global target position;

upon failing to match the global target position to the desired global target position, setting the target position within the largest array to a new value, and repeating until the global target position matches the desired global target position.

12. The computer-readable medium according to claim 11, wherein the method further comprises initially setting the target position within the largest array to a length of the largest array multiplied by the desired global target position.

13. The computer-readable medium according to claim 11, wherein the initial position for each array of the plurality of arrays except for the largest array is chosen so that the element of each array at the initial position is equal to or greater than a desired element.

14. The computer-readable medium according to claim 13, wherein the desired element is the element of the largest array at the target position.

15. The computer-readable medium according to claim 11, wherein the initial position for each array of the plurality of arrays except for the largest array is the first position in each array.

16. The computer-readable medium according to claim 11, wherein the elements in the arrays are strings.

17. The computer-readable medium according to claim 11, wherein the determined global target position matches the desired global target position when it is substantially equal to it.

18. The computer-readable medium according to claim 11, wherein setting the target position within the largest array to a new value is performed using a binary search.

19. The method according to claim 11, further comprising:

finding the next n smallest elements in the union of the plurality of arrays, where n is any desired number.

20. The method according to claim 11, further comprising:

constructing an array from the next n smallest elements in the union of the plurality of arrays, where n is the desired number of elements in the array.

21. A computing system comprising:

a processor; and a computer-readable medium having a computer program stored thereon for execution on a computer, the program adapted to perform a method comprising:

for the largest of a plurality of arrays, each array having a plurality of elements indexable by a pointer for the array, setting the pointer for the largest array to a target position within the largest array;

setting the pointer for each array of the plurality of arrays except for the largest array to an initial position;

determining a global target position by dividing a sum of the pointer for each array by a sum of a length of each array;

determining whether the determined global target position matches a desired global target position;

upon failing to match the global target position to the desired global target position, setting the target position within the largest array to a new value, and repeating until the global target position matches the desired global target position.

22. The computing system according to claim 21, wherein the method further comprises initially setting the target position within the largest array to a length of the largest array multiplied by the desired global target position.

23. The computing system according to claim 21, wherein the initial position for each array of the plurality of arrays except for the largest array is chosen so that the element of each array at the initial position is equal to or greater than a desired element.

24. The computing system according to claim 23, wherein the desired element is the element of the largest array at the target position.

25. The computing system according to claim 21, wherein the initial position for each array of the plurality of arrays except for the largest array is the first position in each array.

26. The computing system according to claim 21, wherein the elements in the arrays are strings.

27. The computing system according to claim 21, wherein the determined global target position matches the desired global target position when it is substantially equal to it.

28. The computing system according to claim 21, wherein setting the target position within the largest array to a new value is performed using a binary search.

29. The method according to claim 21, further comprising:

finding the next n smallest elements in the union of the plurality of arrays, where n is any desired number.

30. The method according to claim 21, further comprising:

constructing an array from the next n smallest elements in the union of the plurality of arrays, where n is the desired number of elements in the array.

* * * * *

UNITED STATES PATENT AND TRADEMARK OFFICE
CERTIFICATE OF CORRECTION

PATENT NO. : 6,266,665 B1           Page 1 of 1
DATED : July 24, 2001
INVENTOR(S) : Shankar Vaidyanathan et al.

It is certified that error appears in the above-identified patent and that said Letters Patent is hereby corrected as shown below:

Column 7,
Line 6, delete the equation "$n\_2(p\_{12=}0)=4$" and insert -- $n\_2(p\_2=0)=4$ -- therefor;

Column 8,
Lines 51 and 52, delete the equation "$T\_a=(p\_1+n\_2+...+p\_d)/(1\_1+1\_2+...1\_d)$" and insert -- $T\_a=(p\_1+p\_2+...+p\_d)/(1\_1+1\_2+...1\_d)$ -- therefor.

Signed and Sealed this

First Day of January, 2002

Attest:

Attesting Officer

JAMES E. ROGAN
Director of the United States Patent and Trademark Office